Figure 6:
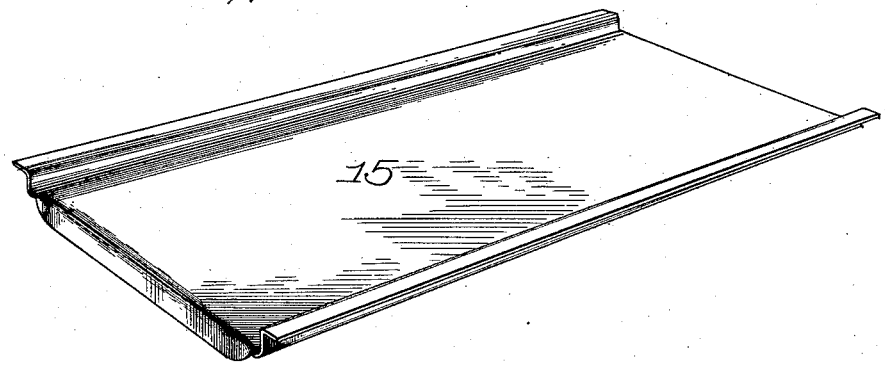

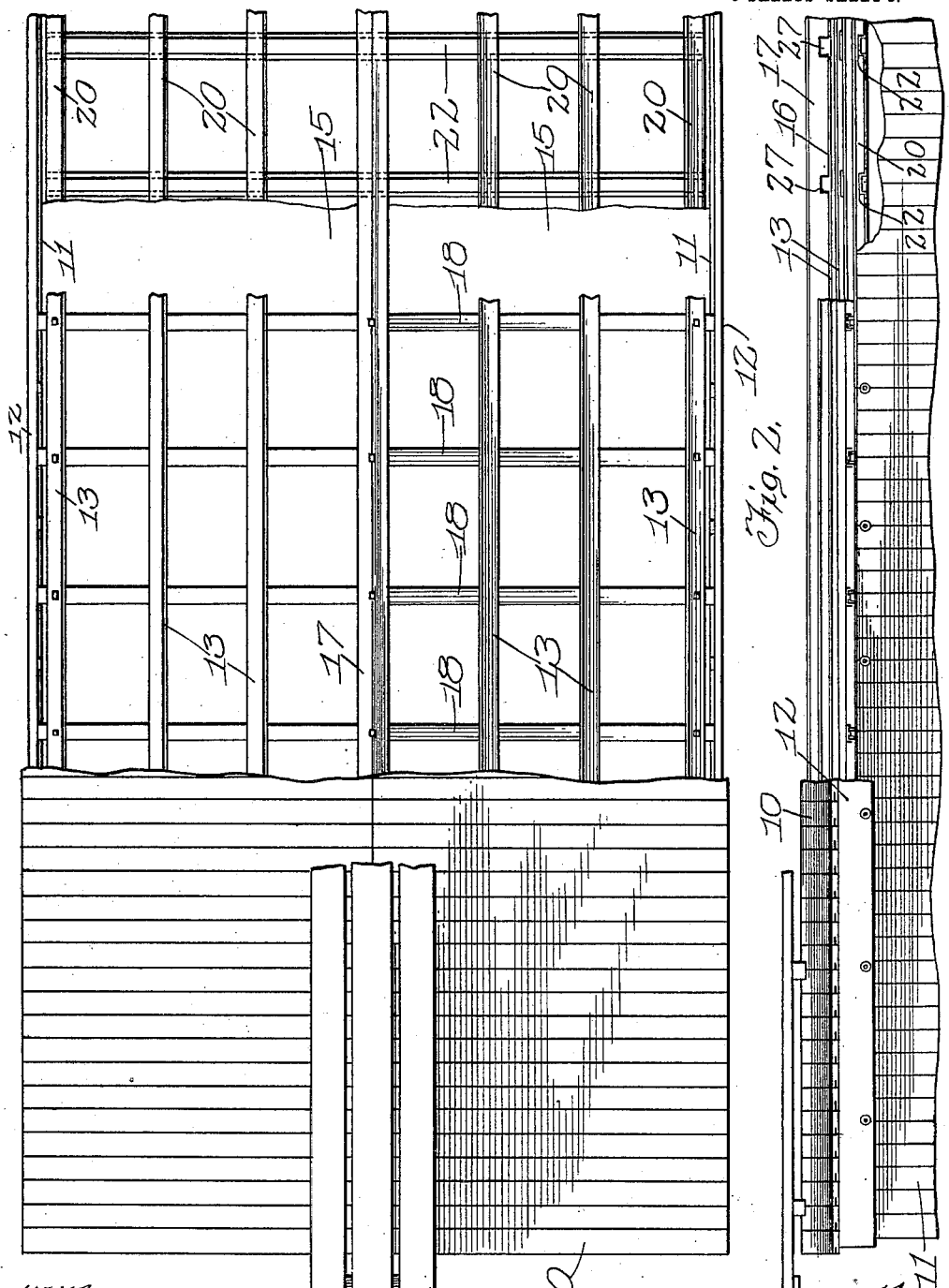

T. N. RUSSELL.
CAR ROOF.
APPLICATION FILED SEPT. 5, 1912.
1,082,974.
Patented Dec. 30, 1913.
3 SHEETS—SHEET 2.
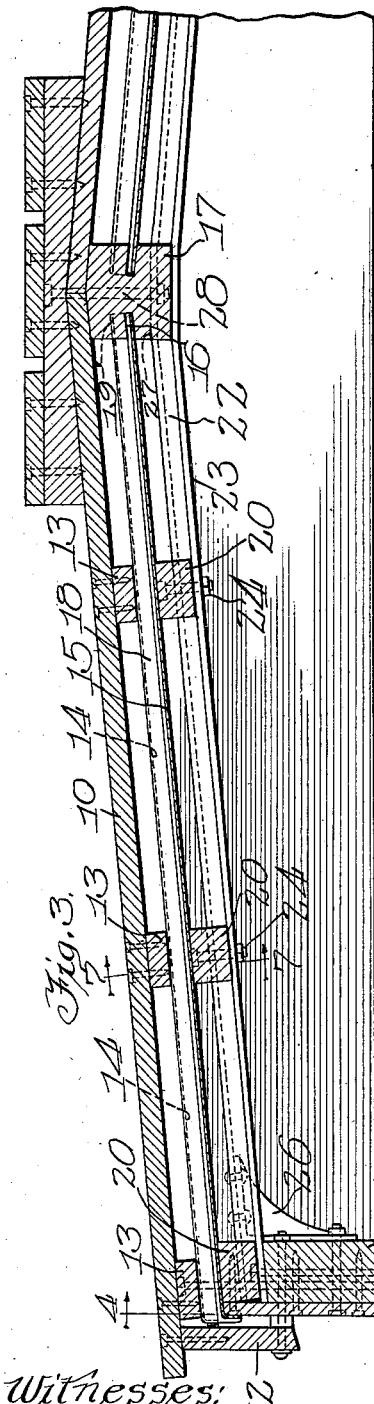
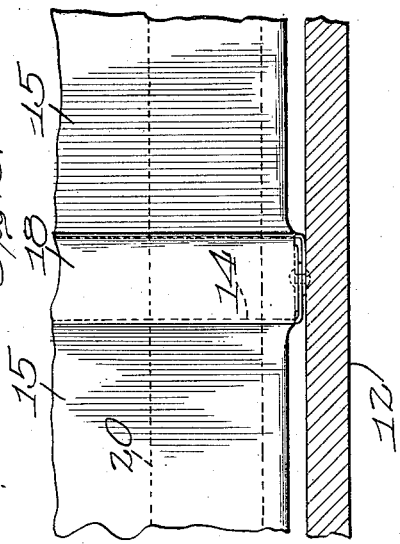
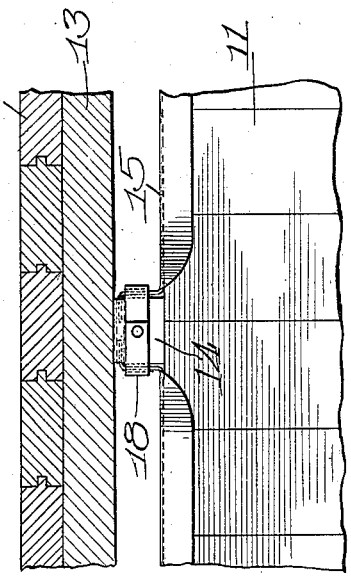
Witnesses:
Inventor:
Thomas N. Russell.
By Adams & Jackson
Attys.

T. N. RUSSELL.
CAR ROOF.
APPLICATION FILED SEPT. 5, 1912.

1,082,974.

Patented Dec. 30, 1913.

3 SHEETS—SHEET 3.

Witnesses:

Inventor:
Thomas N. Russell.
By Adams & Justson
Atty's.

UNITED STATES PATENT OFFICE.

THOMAS N. RUSSELL, OF CHICAGO, ILLINOIS, ASSIGNOR TO CHICAGO-CLEVELAND CAR ROOFING COMPANY, OF CHICAGO, ILLINOIS, A CORPORATION OF ILLINOIS.

CAR-ROOF.

1,082,974.  Specification of Letters Patent.  Patented Dec. 30, 1913.

Application filed September 5, 1912. Serial No. 718,655.

*To all whom it may concern:*

Be it known that I, THOMAS N. RUSSELL, a citizen of the United States, residing at Chicago, in the county of Cook, in the State of Illinois, have invented certain new and useful Improvements in Car-Roofs, of which the following is a specification, reference being had to the accompanying drawings.

This invention relates to improvements in freight-car construction and particularly in respect to the roofs of such cars.

The leading object of the invention is to so construct the roof members that several inches of additional space between the floor and the roof may be had over the space now ordinarily obtainable, and without increasing the height of the car-body or weakening the construction. This I accomplish by the construction and arrangement of parts shown in the drawings and hereinafter specifically described.

That which I believe to be new will be set forth in the claims.

Figure 7:
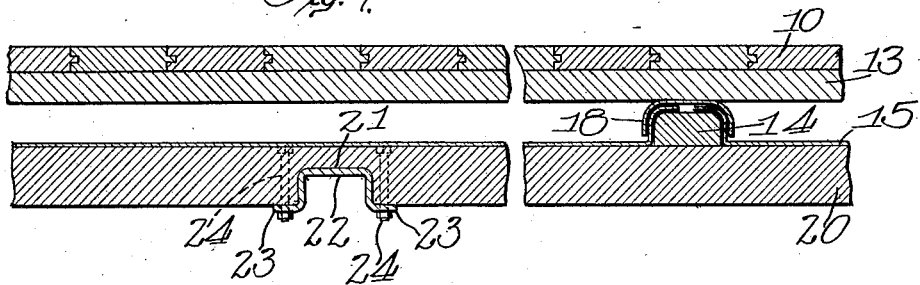
Figure 8:
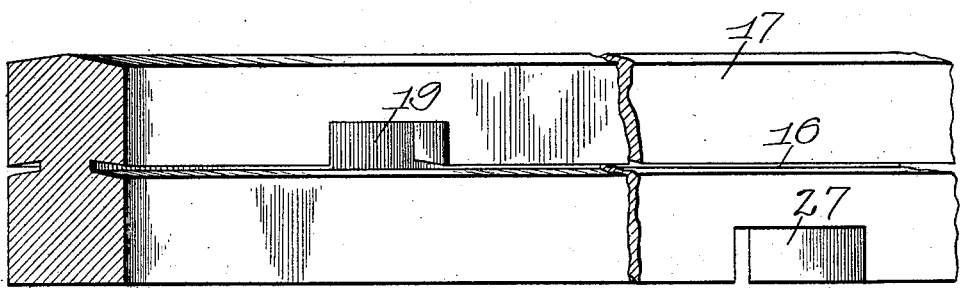

In the drawings,—Figure 1 is a plan view, partly broken away, of a car-roof embodying my improvements; Fig. 2 is a side elevation, also partly broken away, of a car having my improvements embodied therein; Fig. 3 is a cross-section through a portion of the car and its roof; Fig. 4 is a detail being a vertical section taken at line 4—4 of Fig. 3; Fig. 5 is a detail being a plan view of a portion of the sheet-metal covering that rests upon the purlins and the sub-carlines, and showing also the cap over the sub-carline; Fig. 6 is a perspective view of one of the metal roofing-sheets; Fig. 7 is a detail being a vertical section taken at line 7—7 of Fig. 3; and Fig. 8 is a perspective view of a portion of the ridge-pole of the car-roof.

Referring to the several figures of the drawings in which corresponding parts are indicated by like reference numerals—10 indicates the roofing boards or outer sheathing; 11, one of the side walls of the car; 12 one of the fascia boards; 13 the sub-purlins extending longitudinally of the car and to which the roofing-boards 10 are nailed; 14 the sub-carlines which rest upon the main purlins. These main purlins are covered with the metal sheets 15, the inner ends of which sheets are secured in slots 16 in the side faces of the ridge-pole 17 as usual, and the outer ends of which are turned down against the outer faces of the side walls 11. The side edges of the sheets 15 extend over the sub-carlines 14 and are covered by a cap 18, the inner ends of these sub-carlines fitting, together with their coverings of metal sheets 15 and cap 18, into suitably shaped recesses in the side faces of the ridge-pole 17,—one of such recesses being shown in Fig. 8 and indicated by 19.

The parts so far mentioned with the exception of the main purlins are of well-known construction and need no further detailed description.

The main purlins are indicated by 20 and differ from the purlins in use in that in the lower face of each are formed a plurality of wide notches 21, in which are adapted to be seated and secured the several main carlines 22. These carlines 22 are of metal, and as best shown in Fig. 7 are formed of inverted U or channel shape and of a size to closely fit within the notches 21 of the purlins. They are bent at their edge portions to form outwardly-turned flanges 23 which lie against the under faces of the purlins and through such flanges and through the purlins pass retaining bolts 24. The outer ends of the carlines rest upon the usual plates 24 at the sides of the car to which they are bolted by long bolts 25 passing through such plate and through the flanges 23, (see Fig. 3) and they are additionally braced and held in position at their outer ends by brackets 26 bolted to the inner faces of the plates and to the top wall of the channel-shaped carline. That part of a bracket that is secured to a carline is best made of a width to snugly fit between the side walls of the channel as thereby a more rigid union of the bracket and carline is secured.

The ridge-pole 17 is provided in its under face with notches 27 corresponding in size and shape to the notches 21 in the purlins 20 and in alinement with the notches 21, so that the carlines are, at their central portions, received therein and secured by one or more suitable bolts 28.

By my construction I provide a very strong and rigid interlocking of the carlines with the purlins and the ridge-pole as well as a very rigid locking of the ends of the carline to the side plates, and at the same time by insetting the carlines into the purlins and ridge-pole I gain additional headroom in the car and thereby make it better adapted for receiving large and bulky freight.

What I claim as my invention and desire to secure by Letters Patent is—

1. In a car, the combination with a series of purlins each provided with a plurality of notches in one of its faces, of carlines fitted in said notches, said carlines having flanges resting against the faces of the purlins at each side of the notches, and means passing through said flanges and through the unreduced part of the purlins for securing the purlins and carlines together.

2. In a car, the combination with a series of purlins each provided with a plurality of notches in one of its faces, of channel-shaped carlines fitted in said notches, said carlines having turned edge portions forming flanges that rest against the faces of the purlins at each side of the notches, and means passing through said flanges and through the unreduced part of the purlins for securing the purlins and carlines together.

THOMAS N. RUSSELL.

Witnesses:
ALBERT H. ADAMS,
W. H. DE BUSK.

Copies of this patent may be obtained for five cents each, by addressing the "Commissioner of Patents, Washington, D. C."